US008663842B2

(12) United States Patent
Bugnet et al.

(10) Patent No.: US 8,663,842 B2
(45) Date of Patent: Mar. 4, 2014

(54) SILVER POSITIVE ELECTRODE FOR ALKALINE STORAGE BATTERIES

(75) Inventors: Bernard Bugnet, Le Plessis-Trevise (FR); Denis Doniat, Paris (FR); Fabrice Fourgeot, Fontenay-sous-Bois (FR); Robert Rouget, Paris (FR)

(73) Assignee: S.C.P.S. Societe de Conseil et de Prospective Scientifique, S.A., Rosny-sous-Bois (FR)

( * ) Notice: Subject to any disclaimer, the term of this patent is extended or adjusted under 35 U.S.C. 154(b) by 0 days.

(21) Appl. No.: 12/348,385

(22) Filed: Jan. 5, 2009

(65) Prior Publication Data

US 2010/0047689 A1 Feb. 25, 2010

Related U.S. Application Data

(63) Continuation of application No. PCT/IB2007/001901, filed on Jun. 28, 2007.

(30) Foreign Application Priority Data

Jul. 5, 2006 (FR) ..................................... 06 06094

(51) Int. Cl.
*H01M 10/32* (2006.01)

(52) U.S. Cl.
USPC ........... 429/219; 429/206; 429/209; 429/229; 429/231.5

(58) Field of Classification Search
USPC .............................. 429/206, 209, 229, 231.5
See application file for complete search history.

(56) References Cited

U.S. PATENT DOCUMENTS

| | | | | |
|---|---|---|---|---|
| 3,223,555 | A | 12/1965 | Solomon | |
| 3,282,732 | A | 11/1966 | Bradley | |
| 4,167,609 | A * | 9/1979 | Scarr | 429/206 |
| 4,387,143 | A * | 6/1983 | Arita et al. | 429/174 |
| 4,835,077 | A | 5/1989 | Megahed | |
| 5,981,105 | A | 11/1999 | Smith | |
| 6,183,900 | B1 * | 2/2001 | Bronoel et al. | 429/72 |
| 6,489,056 | B1 * | 12/2002 | Davis et al. | 429/218.2 |
| 2006/0257744 | A1 * | 11/2006 | Burchardt | 429/229 |
| 2008/0038630 | A1 * | 2/2008 | Cheiky | 429/131 |

* cited by examiner

*Primary Examiner* — Patrick Ryan
*Assistant Examiner* — Ben Lewis
(74) *Attorney, Agent, or Firm* — Sturm & Fix LLP

(57) ABSTRACT

Silver positive electrode for alkali secondary batteries having an enhanced cycling capability, and consequently a longer lifetime in cycling of the storage batteries incorporating it, by optimizing, in recharge mode, the conditions for electrochemically reducing the oxidized silver species. The silver electrode according to the invention is of the plasticized type, and a high-porosity collector, such as a woven fabric, a felt or a reticulated cellular metal foam, is used. The active compound introduced into the collector is prepared in paste form, in which the active material consists of metallic silver particles and/or silver monoxide particles, and may advantageously include a metal oxide acting as pore-forming and wetting agent for the electrode. Such an electrode is particularly intended for mounting in silver-zinc storage batteries operating in open mode or sealed mode.

8 Claims, 1 Drawing Sheet

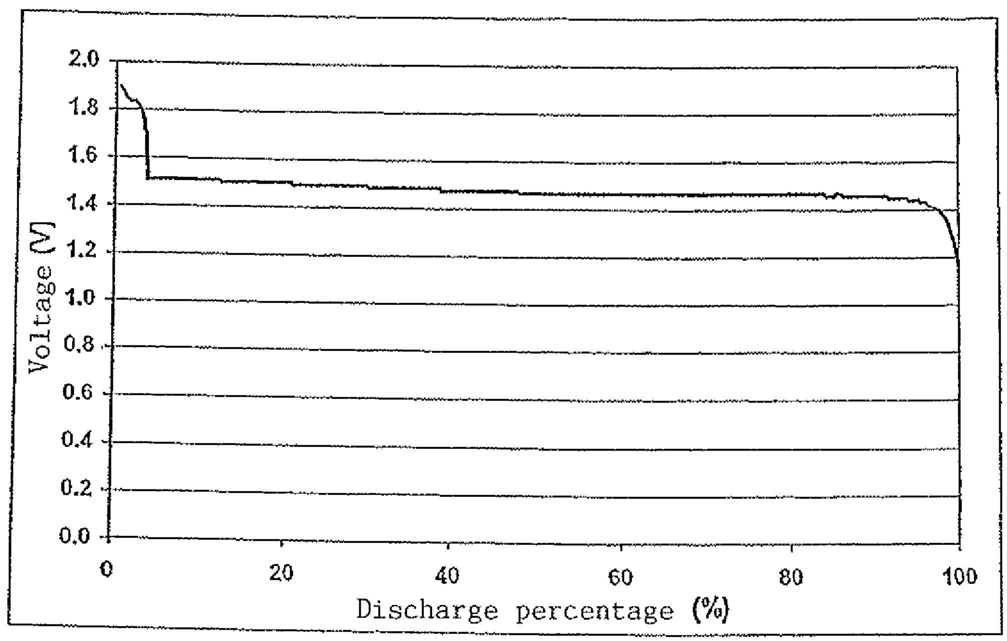
2.0
1.8
1.6
1.4
1.2
1.0
0.8
0.6
0.4
0.2
0.0
Voltage [V]
0
20
40
60
80
100
Discharge percentage (%)

SILVER POSITIVE ELECTRODE FOR ALKALINE STORAGE BATTERIES

CROSS REFERENCE TO RELATED APPLICATIONS

This application is a Continuation application of PCT/IB2007/001901 filed Jun. 28, 2007, claiming priority of FR 0606094 filed Jul. 5, 2006, which are incorporated by reference herein in their entirety.

BACKGROUND OF THE INVENTION

1. Field of the Invention

The present invention related to alkaline storage batteries having a silver positive electrode.

In particular, the invention relates to new technology relating to silver positive electrodes, the application thereof to alkaline storage batteries, in particular in combination with a zinc negative electrode, the separators and electrolyte used, and the functioning of the silver-zinc (AgZn) storage battery thus formed, both in an open mode and in a tight mode.

2. Description of the Related Art

Electrochemical couples which use a silver electrode (silver-zinc, silver-cadmium, . . . ) have been known the 19$^{th}$ century.

The effective use of alkaline secondary systems having a silver positive electrode has only really been developed since 1940, after Henri Georges ANDRÉ developed a silver-zinc storage battery using cellophane separators as semi-permeable membranes and zinc electrodes, it being attempted to develop the porosity of said electrodes.

Despite this progress and other developments resulting therefrom, the service life of AgZn storage batteries has remained somewhat limited (approximately after tens of cycles), it being difficult to obtain one hundred cycles. Furthermore, they could only be used "commercially" in open configurations. This led to their application being viewed as limited to some military uses, for which above all the high levels of power specific to the system are sought.

The AgZn storage battery's low aptitude for cycling is mainly attributed to the behaviour of the zinc electrode in an alkaline environment. The behaviour of the silver electrode is also responsible for this.

The reactions which take place at the anode are as follows for an alkaline storage battery:

charge $$Zn+2OH^{-} \leftrightarrows ZnO+H_2O+2e^{-}$$

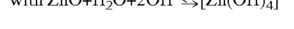

$$\text{with } ZnO+H_2O+2OH^{-} \leftrightarrows [Zn(OH)_4]^{2-}$$

discharge

In fact, the zinc electrode is generally recharged with its oxides and hydroxides and zincates due to the formation of deposits which are of a modified structure compared with their original form and are often described as dendritic, spongy or pulverulent. The phenomenon occurs increasingly within a wide range of current densities.

The subsequent recharges thus lead quickly to anarchic increases or thrusts of zinc through the separators and to short-circuiting with the electrodes having opposite polarity.

The pulverulent or spongy-type deposits do not allow electrodes which are able to function in a satisfactory and lasting manner to be restored since the adhesion of the active matter is insufficient.

Moreover, the reduction of oxides, hydroxides and zincates to metal zinc at the anode during recharging phases is also characterised by changes to the morphology of the electrode itself. In accordance with the operating modes of storage batteries, different types of modifications to the shape of the anode are observed, caused by the zinc being redistributed in a non-uniform manner during its formation. In particular, this may result in situ in a detrimental densification of the anodic active mass at the surface of the electrode, most likely at the central region thereof. At the same time, the porosity of the electrode is generally reduced, which helps accelerate the preferential formation of zinc at the surface of the electrode.

These significant drawbacks which reduce the number of cycles that can be carried out to only a few tens (a level which is insufficient to afford a secondary system any real economic benefit) have led to a vast number of studies being carried out with the objective of improving the features of the zinc deposit during recharging with a view to increasing the number of charge-discharge cycles which the generator could support.

A substantial development was made and disclosed in the disclosure of invention of publication number FR 2 788 887, supplemented by that of publication number FR 2 828 335, the technology described of zinc anodes making it possible to achieve hundreds of cycles within a wide range of operating modes and up to very high discharge levels owing to the use of means for increasing the performance of the active matter used by improving the percolation of the charges in said active matter.

BRIEF DESCRIPTION OF THE DRAWING

FIG. 1 is a graph showing percentage (%) of discharge plotted as compared to a corresponding voltage.

DETAILED DESCRIPTION OF THE PREFERRED EMBODIMENT

This invention is based on the observation that insufficient draining of the charges within the active matter promotes the formation of zinc deposits during recharging at sites representing only a limited percentage of the entire active mass. This increase in zinc, which usually leads to pushes through the separators due to the anarchic character of the deposit or to densification of the deposit, is thus caused by sites having a total surface area which is limited compared to the total developed surface area of the anodic matter.

The technology disclosed in the abovementioned document shows that the mechanism may be considerably reduced if the same total amount of zinc can be deposited on a much larger surface by greatly multiplying the formation sites of the deposit within the complete volume of the electrode.

According to a preferential application, this technology translates into the use, within the zinc anode, of a double or triple level of electrical collection:

- a principal collector network: an electrode support-collector of the "metal foam" type (reticulated cellular structure),
- a secondary conductor network: a dispersion of chemically inert conductive ceramic particles in the accumulator,
- an optional complementary tertiary conductor network: a dispersion of bismuth in the anodic active mass.

An "antipolar mass" may also be introduced in the zinc anode and may contribute significantly to the performance level obtained.

In contrast to the prior art within this field, this new electrode may function conveniently in a concentrated alkaline medium, without the use of a plurality of separator layers for delaying diffusion of the zincates on the one hand, and on the other hand, the increase of dendrites.

In usage conditions, nickel-zinc accumulators which integrate this new anode technology have a reduced internal resistance and may satisfy high demands for power without any passivation to the zinc electrode.

With regard to silver-zinc accumulators corresponding to conventional prior art, the separators have a dual function:

to avoid migration of zincate ions and delay dendritic increase in zinc during charging, to stop migration of silver soluble ions ($Ag^+$ and $Ag^{2+}$) and metallic silver particles during subsequent cycles.

Cellophane is the material conventionally preferred for the separators of AgZn accumulators since, for a cycle system with a low capacity, it offers the best compromise between cost and performance. However, cellophane requires the use of a highly concentrated alkaline electrolyte, usually made of 10 to 12 N potassium, so as to limit hydrolysis of the cellulose.

In order to obtain operation times lasting tens of cycles, at least four layers of cellophane membrane are necessary as well as fibrous separator layers, this then promoting retention of the electrolyte between the electrodes (role of electrolyte reservoir).

Substitutes for cellophane have been suggested: cellophane treated with silver, microporous polypropylene separator incorporating cellulose acetate, polyvinyl alcohol, etc., without having to reduce the number of separator layers necessary for acceptable functioning of the AgZn accumulator.

Owing to the short service life of the AgZn system, which it does not seem possible to avoid as a result of the well-known rapid degradation of the zinc anode, relatively few studies have been devoted to silver cathodes used in this accumulator in order to improve the function thereof.

These cathodes are usually produced by sintering metallic silver powder or silver monoxide ($Ag_2O$), the latter being reduced to metallic silver during the sintering phase. The collector used is formed of a fabric, or a perforated or spread out sheet, made of pure silver.

Electrodes of this type offer high specific capacities (up to 300 Ah/kg and 1,500 Ah/$dm^3$), but in order to obtain tens of cycles of AgZn storage battery use, these positives must be connected to highly super-capacitive zinc anodes so as to avoid subjecting them to significant discharge levels. Moreover, the system is produced with multiple separator layers. These two constraints are detrimental to the specific energies of the storage battery thus formed.

The authors of the present patent application have attempted logically to improve the AgZn system by means of the considerable progress made with regard to zinc anodes using the technology disclosed by the aforementioned patent FR 2 788 887.

A negative zinc electrode of this type in fact offers substantial answers to the problems and constraints of AgZn storage batteries owing to its significant service life during cycles, with no morphological modification, including during times of high charging and discharging, up to extremely high discharge levels (making it possible to avoid high anodic overcapacity), made of concentrated electrolytes (indispensable for cellophane use), and without having to use multiple separator layers.

The authors of the present invention have, however, proven that the mere combination of a conventional silver electrode, as described above, and a zinc electrode produced in accordance with publication numbers FR 2 788 887 and FR 2 828 335, will not result in a satisfactory number of cycles owing to the short service life of a silver cathode of this type: rapid progressive degradation during cycles, with significant migration of soluble species saturating the opposite electrode and the separators until short-circuiting occurs.

The authors have thus produced storage batteries by placing a silver electrode of a conventional type, of which the collector was a silver perforated sheet of nominal capacity 0.75 Ah, between two zinc electrodes in accordance with the technology disclosed in the aforementioned documents FR 2 788 887 and FR 2 828 335. In this set-up, the anodes exhibited an overcapacity of 30% compared with the cathode, the aptitude of the zinc anode being known so as to be able to measure the aptitude of the silver electrode during long-lasting cycles.

The electrolyte was made of 10 N potassium saturated in zinc oxide and containing 10 g/liter lithium hydroxide (LiOH).

The storage batteries were cycled in accordance with 0.2 $C_5$ A, with a discharge level of 70% calculated on the nominal capacity of the silver cathode. Cycling was stopped when the capacity exceeded the level of 50% of the initial nominal capacity. This value was obtained after approximately 90 to 100 cycles according to the various set-ups.

The object of the present invention is to provide new technology for producing a silver positive electrode which, for the first time, makes it possible to considerably increase the aptitude of cycling of the electrode and consequently to increase the service life of the AgZn storage battery during cycling.

According to the present invention, it is proposed to produce a silver electrode which may be of the plasticised type by using a three-dimensional collector, the active mass optionally advantageously including a porophore agent and an agent for wetting the electrode.

By means of the studies defining new silver electrode technology it was sought, in particular, to develop a cathode which can function under good homogeneous conditions of the electrical field and good conditions of ionic diffusion within said cathode in such a way that conditions for electrochemically reducing silver oxidised species during recharging are optimised so as to be able to obtain a metallic silver deposition within the electrode that is as complete and homogeneous as possible.

A highly porous three-dimensional collector and a large developed surface area on the one hand and, on the other hand, cathodic additives formed of metallic oxides, acting as a porophore agent and an agent for wetting the electrode and optionally also having the ability to fix $Ag^+$ and $Ag^{2+}$ soluble ions, are necessary in order to obtain the required usage conditions.

In particular, the authors noted that some metal oxides used led to a major change in the charging and discharging mechanism of the silver electrode together with a significant increase in the cycle length of the storage battery.

The three-dimensional collector used is preferably of the reticulated cellular metal foam type; the cathodic additive is preferably formed of zinc oxide, calcium oxide and/or titanium dioxide.

The scope of the invention will be better understood from the following examples which describe the operating modes of the silver electrode according to the invention as well as that of the silver-zinc storage batteries incorporating zinc anodes produced in accordance with the descriptions in publications FR 2 788 887 and FR 2 828 335.

EXAMPLE 1

In order to produce a three-dimensional cathodic collector, a 90 PPI nickel foam having a surface density of 500 g/$m^2$ and having a thickness reduced by means of compaction or lamination of 1.6 mm to 1.0 mm is obtained by the deposit (in particular electrolytic) of a fine layer of silver, of which the thickness is at least approximately a micron.

In order to test, in a first step, the exclusive influence of a collector of this type on the behaviour of the cathode, the production steps according to the conventional method for preparing silver-sintered electrodes are followed: a paste is produced by mixing silver monoxide powder ($Ag_2O$), of which the particles have a diameter lower than or equal to 40 microns, with water and with carboxymethylcellulose, and the porosity of the foam is filled with this.

After drying, the electrode is thermally treated in a reducing atmosphere at approximately 700° C. in order to reduce the oxide and sinter the silver powder thus obtained and the collector. The electrode is then compressed under 2,000 kPa so as to reduce its thickness to 0.5 mm.

The electrode thus obtained is placed between two zinc electrodes produced according to the description of publications FR 2 788 887 and FR 2 828 335, the anodes being super-capacitive compared to the silver cathode.

The separators are formed of a microporous polyethylene membrane layer (Celgard 3401) arranged on the zinc electrodes, a polyamide fibrous separator (Viledon) acting as an electrolyte reservoir, and a grafted polyethylene separated layer (Shanghai Shilong Hi-Tech Co) placed in contact with the silver electrode. No cellophane membrane was used so as to ensure that progressive hydrolysis thereof did not interfere with observing the performance of the silver electrode itself.

The electrolyte is a 10 N potassium saturated in zinc oxide and containing 10 g/liter lithium hydroxide and 0.5 g/liter aluminium.

The silver electrode has a nominal capacity of 0.75 Ah, corresponding to an efficiency relative to maximum capacity which does not exceed 50%.

It is cycled in an open storage battery in accordance with 0.2 $C_5$ A, with a discharge level of 70% calculated on the nominal capacity of the silver cathode.

It is noted that this electrode sintered on a metal foam support maintains good stability of its capacity during almost 100 cycles, at approximately 80% of its initial capacity. However, capacity then decreases rapidly. Cycling is stopped when capacity is less than 50% of the initial nominal capacity, a level which is reached after approximately 200 cycles.

The benefit of a highly porous three-dimensional collector and a large developed surface, in particular in this example of a metal reticulated foam, is clearly evident through a doubled service life measured in accordance with cycling stopping at 50% of the initial nominal capacity.

The grade of the foam and therefore the size of its pores may be selected from a wide range, preferably grades 45 to 100 inclusive, the selection in particular optionally being dependent on the thickness defined for the cathode and power densities which are to be obtained with the system.

The deposit of silver carried out on a nickel foam makes it possible, in all operating modes tested, to obtain a considerable improvement in cathode efficiency, this coating of silver increasing the surge of oxygen at the electrode.

Variant embodiments have shown that other types of collector having highly porous three-dimensional structures, such as three-dimensional metal fabrics (in particular of the type in which the structure may be produced using Raschel weaving looms) or metal felts may also be used effectively as an electrode support.

It is also noted that a three-dimensional collector of this type may be produced according to the invention so as to be made of any metal which is compatible with the potential use of the cathode, optionally coated with a layer of silver. In particular, it is possible to produce a collector of this type in silver.

EXAMPLE 2

A silver electrode of the plasticised type is produced by filling a 90 PPI nickel foam coated in silver by means of electrolytic deposition according to the description of example 1 with a paste made of silver monoxide powder ($Ag_2O$), of which the particles have a diameter lower than 40 microns, a hydrophobic binder, for example made of PTFE added at a rate of 3% by weight relative to the active matter and water as a solvent.

After drying, the electrode is compressed at 2,000 kPa. The cathode obtained is used as a positive electrode in an AgZn storage battery identical to that described in example 1. The electrolyte is also identical.

The nominal capacity is 0.8 Ah, that is to say 98% of the maximum capacity. The electrode is cycled in accordance with 0.2 $C_5$A, with a discharge level of 70%.

Cycling is stopped after 120 cycles, when the electrode reaches 50% of its nominal initial capacity, after having passed from 80% at 45 cycles and 62% at 100 cycles.

The organic binder used to implement the cathodic paste may advantageously, in addition to PTFE, be made of PVDF, a styrene-butadiene copolymer (SBR), an acrylonitrile-butadiene copolymer (NBR) or a mixture thereof.

The binder may also advantageously be added at a rate of approximately 1 to 10% by weight based on the active matter, and preferably at a rate of 2 to 6%.

EXAMPLE 3

A silver electrode of the plasticised type, of which the active matter is introduced in the form of silver monoxide ($Ag_2O$), is produced according to example 2 but by adding zinc oxide powder (ZnO) to the paste at a rate of 3% by weight based on the active matter.

After drying, the electrode is compressed at 2000 kPa. The cathode obtained is used as a positive electrode in an AgZn storage battery identical to that described in examples 1 and 2. The electrolyte is also identical.

Nominal capacity is 0.8 Ah, that is to say 98% of maximum capacity. The electrode is cycled in accordance with 0.2 $C_5$ A, with a discharge level of 70%.

Cycling is stopped after 140 cycles, when the electrode reaches 50% of its nominal initial capacity, after having passed from 80% at 48 cycles and 73% at 100 cycles. After 100 cycles the progressive loss in capacity is accelerated.

EXAMPLE 4

A silver electrode of the plasticised type, of which the active matter is introduced in the form of silver monoxide ($Ag_2O$), is produced according to example 3, but the amount of zinc oxide in the powder passes from 3 to 30% by weight based on the active matter.

After drying, the electrode is compressed at 2000 kPa. The cathode obtained is used as a positive electrode in an AgZn storage battery identical to that described in the preceding examples. The electrolyte is also identical.

Nominal capacity is 0.78 Ah, that is to say 96% of maximum capacity. The electrode is cycled in accordance with 0.2 $C_5$ A, with a discharge level of 70%.

Cycling is stopped after 135 cycles, when the electrode reaches 50% of its nominal initial capacity, after having passed from 80% at 95 cycles and 76% at 100 cycles. After 100 cycles, the progressive loss in capacity is accelerated.

The benefit of the presence of zinc oxide is measured based on the results compared from examples 2 to 4 through an increase in the stability of the level of capacity (from 10 to 15% greater after 100 cycles), these improved capacities translating into an increase in service life if cycling is stopped at 50% of initial nominal capacity.

When analysing the results of the various embodiments, it was noted that it is advantageous to use quantities of zinc oxide between 1.5 and 50% by weight based on the active matter, and preferably between 5 and 35%, in order to obtain a significant effect with no excessive deterioration of specific capacities.

EXAMPLE 5

A silver electrode of the plasticised type is produced by filling a 90 PPI nickel foam coated in silver by means of electrolytic deposition according to the description of example 1 with a paste formed, for the active matter, of metallic silver powder having a particle size distribution advantageously between 0.2 and 40 microns, the mean diameter of the particles preferably being approximately 2 microns, a hydrophobic binder made of PTFE added at a rate of 3% by weight based on the silver mass, and water as a solvent.

After drying, the electrode is compressed at 2000 kPa. The cathode obtained is used as a positive electrode in an AgZn storage battery identical to that described in the preceding examples. The electrolyte is also identical.

Nominal capacity is 0.7 Ah, that is to say 65% of maximum capacity. The electrode is cycled in accordance with 0.2 $C_5$ A, with a discharge level of 70%. Cycling is stopped after 250 cycles, when the electrode reaches 50% of its nominal initial capacity, after having passed from 80% at 175 cycles.

The various uses have proven that better efficiency is obtained with finer silver powders, whereas larger powders promote greater power demands.

The preferential choice of the authors is for powders having a particle size distribution substantially of approximately 0.8 to 5 microns.

EXAMPLE 6

A silver electrode of the plasticised type is produced according to the procedure described in example 5, by adding zinc oxide at a rate of 30% by weight based on the silver mass to the active mass.

After drying, the electrode is compressed at 2000 kPa. The cathode obtained is used as a positive electrode in an AgZn cell identical to that described in the preceding examples. The electrolyte is also identical.

Nominal capacity is 0.6 Ah, that is to say 72% of maximum capacity. The electrode is cycled in accordance with 0.2 $C_5$ A, with a discharge level of 70%.

More than 500 cycles are obtained, the capacity obtained after said 500 cycles still being 60% of nominal capacity after having passed from 80% at 215 cycles.

EXAMPLE 7

A silver electrode of the plasticised type is produced according to the procedure described in example 5 but by adding titanium dioxide a rate of 30% by weight based on the silver mass to the active mass.

After drying, the electrode is compressed at 2000 kPa. The cathode obtained as a positive electrode in an AgZn cell identical to that described in the preceding examples. The electrolyte is also identical.

Nominal capacity is 0.8 Ah, that is to say 85% of maximum capacity. The electrode is cycled in accordance with 0.2 $C_5$ A, with a discharge level of 90%.

More than 350 cycles were obtained, the capacity obtained after said 350 cycles still being 80% of nominal capacity.

EXAMPLE 8

A silver electrode of the plasticised type is obtained according to the procedure described in example 5 by adding zinc oxide and titanium dioxide at a rate of 18% and 12% by weight respectively based on the silver mass to the active mass.

After drying, the electrode is compressed at 2000 kPa. The cathode obtained is used as a positive electrode in an AgZn cell identical to that described in the preceding examples. The electrolyte is also identical.

The nominal capacity is 0.9 Ah, that is to say 90% of maximum capacity. The electrode is cycled in accordance with 0.2 $C_5$ A, with a discharge level of 90%.

More than 500 cycles are obtained, the capacity obtained after said 500 cycles still being 80% of nominal capacity.

Examples 5 to 8 show that using silver powder as active matter produces a significant increase in terms of stability of cycling capacity, leading to a considerable increase in the service life of the silver cathode and the AgZn storage battery.

These characteristics are strengthened by the presence of metal oxides acting as a porophore. These additives, formed of zinc oxide or titanium dioxide inter alia, may be effectively added in a wide range of quantities similar to those described in examples 3, 4 and 6 to 8, that is to say advantageously between 1.5 and 50% by weight based on the active matter and preferably between 5 and 35%. The porophore additives mentioned in the examples may also be mixed in varying proportions, the sum of the two additives advantageously being 1.5 to 50% by weight of the active matter and preferably 5 to 35%.

Titanium dioxide, in addition to producing a significant improvement in the cyclability of the silver electrode, modifies the speed of discharge curve of the AgZn storage battery, as shown in the single FIGURE.

An almost complete disappearance of the first discharge plateau to the profit of a second plateau can be seen.

Without the authors of the present invention providing a theory explaining the phenomenon, it appears that the disappearance of this first plateau does not affect the efficiency of the silver electrode. In fact, it is seen that in the presence of titanium dioxide, the capacity of the electrode obtained is equal to or greater than 90% of maximum capacity.

The subsequent reactions of silver oxide reduction appear to take place in a single step according to the following reaction:

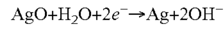

$$AgO+H_2O+2e^-\rightarrow Ag+2OH^-$$

EXAMPLE 9

A silver electrode according to example 6 is produced. A zinc electrode according to a procedure described in FR 2 828 335 is obtained. The electrodes are cropped to a suitable size so as to be placed, after coiling, in an R6 (or AA) battery cell. The selected ratio of capacities of the positive and negative electrodes is 1. The separators used are identical to those described in the preceding examples.

The storage battery is filled with an electrolyte formed of 10 N potassium, saturated with zinc oxide and containing 20 g/liter lithium hydroxide and 0.5 g/liter aluminium.

A recombination catalyst of hydrogen and oxygen obtained according to a procedure described in French patent No. 03.09371 is fixed to the inner face of the cover. This is then closed and the storage battery thus obtained is subject, after formation, to cycling in accordance with 0.25 C (C/4) when charging and 0.5 C (C/2) when discharging. The storage battery operates in a tight manner.

The initial nominal capacity of the elements thus produced, of which optimisation was not sought in this case, is from 1.10 to 1.15 Ah in accordance with storage batteries, is maintained at 100% at 180 cycles and decreases to 90% after 250 cycles and 79% after 390 cycles. Cycling is started.

Cycling of R6 elements, in a tight manner, carried out in accordance with C/4 when charging and discharging, at ambient temperature, charging being carried out at a constant current with no limitation to voltage, with overcharging of 10% shows that with the recombination device of the gases mentioned above, internal pressure remains limited to a maximum of 600 kPa which is perfectly compatible with assembly in cylindrical cells.

For the non-optimised capacity of 1-10 Ah mentioned above, measured in R6 format and taking into consideration the mean discharge voltage of 1.50 volt and the corresponding mass of 22.2 g, the nominal mass and density energies are 74 Wh/kg and 198 Wh/liter.

Various tests of function and storage at temperatures differing from ambient temperature have shown the excellent behaviour of silver-zinc storage batteries according to the invention.

The following results will be mentioned which were obtained with tight storage batteries of the R6 type by way of illustrating the performance levels obtained by using the present invention:

- For charging and discharging carried out in accordance with C/5 and at 55° C., the capacity obtained is 88% of nominal capacity for a cutoff voltage of 1.0 volt.
- After charging at C/5 at ambient temperature and storing for 72 hours at 55° C., discharging at C/5 at ambient temperature resulted in 84% of nominal capacity for a cutoff voltage of 1.0 volt.
- After charging at C/5 at ambient temperature and storing for 72 hours at −20° C., discharging at C/4 at ambient temperature resulted in 96% of nominal capacity for a cutoff voltage of 1.0 volt.

These examples have helped to show that a silver electrode of the plasticised type produced by filling a metal foam using a paste containing metallic silver particles as the active matter, and a zinc oxide, calcium oxide, or titanium dioxide powder acting as a porophore agent and as an agent for fixing $Ag^+$ and $Ag^{2+}$ soluble ions has a much greater cycling aptitude and efficiency than those of the sintered electrodes and the cycling aptitude and efficiency are also improved compared to those of plasticised electrodes of which the active matter is introduced in the form of silver oxide.

The use of titanium dioxide alone or mixed with zinc oxide also improves the efficiency of the silver electrode and considerably increases its cycling aptitude.

Titanium dioxide also modifies the process of electrochemical reduction of the silver electrode by reducing and even eliminating the first discharge plateau corresponding to the reduction of silver oxide into silver monoxide.

The authors have shown that the use of silver monoxide powder as cathodic active matter in three-dimensional plasticised electrodes according to the invention generally results in initial nominal capacities that are greater than those obtained when using metallic silver powder. They have also shown, however, as can be seen largely by comparing the results provided in the examples, that using metallic silver powder results in a greater stability of cycling capacity and longer service life.

They therefore produced cathodes according to the invention by combining metallic silver and silver monoxide in varying proportions and have been able to show that such combinations make it possible to obtain electrodes which perform well both in terms of specific capacity and service life.

Ag-$A_2O$ combinations of varying proportions may be selected, in particular depending on the intended application and the type of characteristic primarily thought within the scope of each combination.

The combination of silver cathodes according to the invention and zinc anodes obtained according to the technology described in French patent numbers FR 2 788 887 and FR 2 828 335 makes it possible to produce alkaline silver zinc storage batteries in open and tight configurations, in a prismatic or cylindrical shape, which have an excellent cycling aptitude and use potassium-based electrolytes having initial concentrations greater than or equal to 7 N. This prolonged cycling aptitude is confirmed by capacity ratios between negative and positive electrodes varying advantageously according to the set-ups of the unit obtained of approximately 1.50, in particular in combination with a definitive thickness and varied surface capacity of the electrodes.

In comparable conditions and without departing from the scope of the present invention it is possible to combine one or more silver cathodes according to the invention with one or more cadmium anodes, in particular of the type plasticised to a metal foam collector, in order to obtain alkaline-silver cadmium AgCd storage batteries able to function effectively in open and tight manners and to constitute, in particular, excellent power systems.

The invention claimed is:

1. Silver-zinc secondary battery comprising, in the discharged state:

- an alkaline electrolyte comprising potassium hydroxide having a concentration greater than or equal to 7 N,
- one or more silver electrode(s) and
- one or more zinc oxide electrode(s),
- wherein said silver electrode or electrodes consist(s) in a highly porous three-dimensional collector filled with an active mass comprising metallic silver particles, an organic binder, titanium dioxide and zinc oxide as a pore-forming and wetting agent,
- wherein the quantity of titanium oxide is between 5 and 30% by weight of active matter;
- wherein the quantity of zinc oxide is between 5 and 30% by weight of active matter; and
- wherein the sum of titanium oxide and zinc oxide is between 10 and 35% by weight of active matter.

2. Silver-zinc secondary battery according to claim 1, wherein the silver powder has a particle size distribution between 0.1 and 40 microns.

3. Silver-zinc secondary battery according to claim 1 or 2, wherein the pore-forming additive represents 1.5 to 50% by weight of the active matter.

4. Silver-zinc secondary battery according to claim 1 or 2, wherein the highly porous three-dimensional collector is a reticulated cellular metal foam or a metal fabric or a metal felt.

5. Silver-zinc secondary battery according to claim 1 or 2, wherein the highly porous three-dimensional collector is made of silver or nickel optionally coated with a silver layer.

6. Silver-zinc secondary battery according to claim 1 or 2, wherein the organic binder is PTFE, PVDF, a styrene—butadiene copolymer (SBR), an acrylonitrile—butadiene copolymer (NBR) or a mixture thereof.

7. Silver-zinc secondary battery according to claim 1 or 2, wherein the binder represents from 1 to 10% by weight of the active matter.

8. Silver-zinc secondary battery according to claim 1 or 2, which is in a compressed form and has a thickness of 0.5 mm.

* * * * *